W. N. BATES.
Broom.
No. 39,874. Patented Sept. 15, 1863.
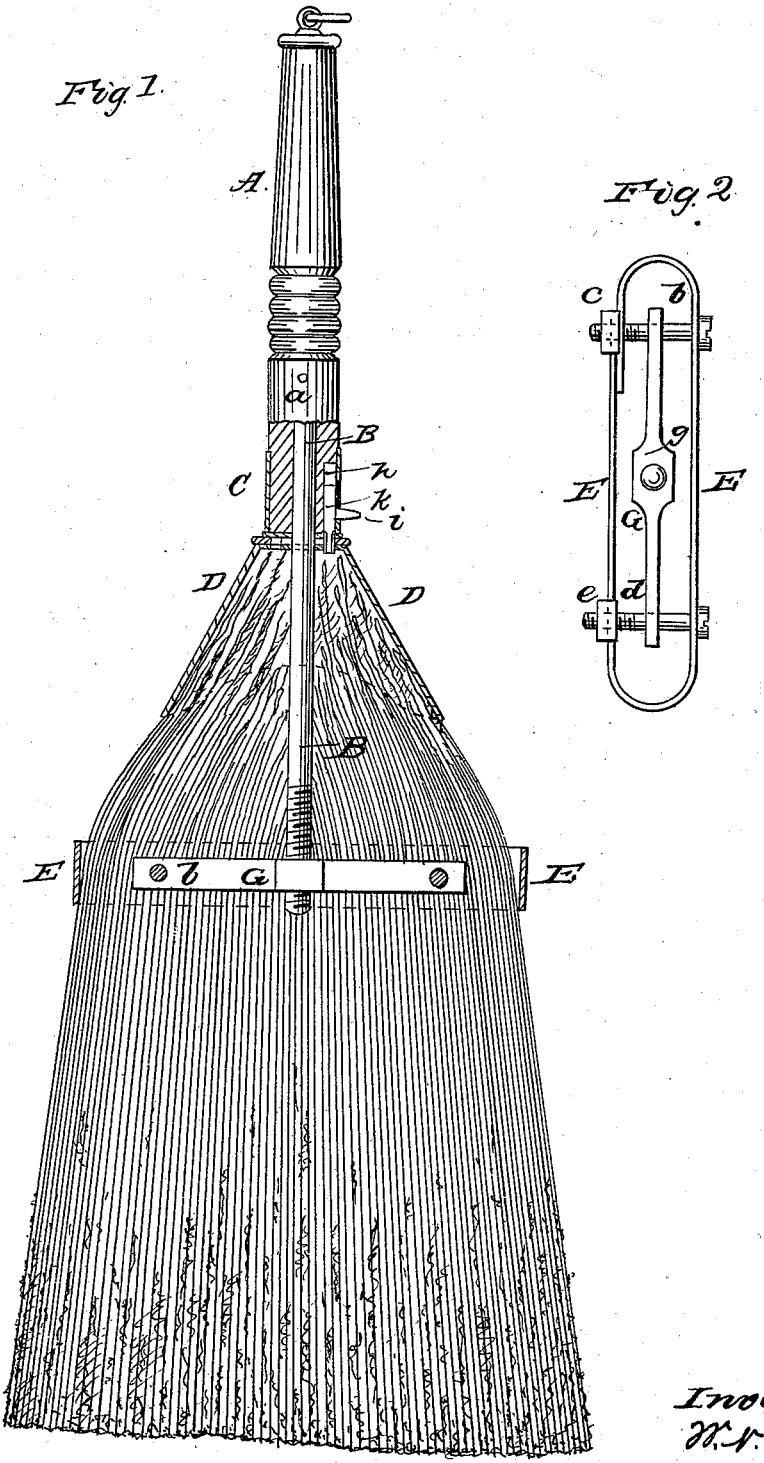
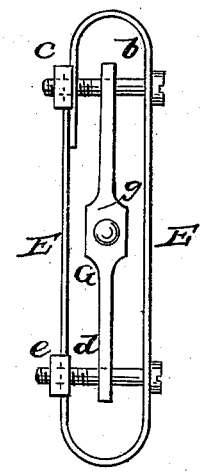

UNITED STATES PATENT OFFICE.

WILLIAM N. BATES, OF CEDAR RAPIDS, IOWA.

IMPROVED BROOM.

Specification forming part of Letters Patent No. 39,874, dated September 15, 1863; antedated January 10, 1862.

*To all whom it may concern:*

Be it known that I, WILLIAM N. BATES, of Cedar Rapids, in the county of Linn and State of Iowa, have invented a new and useful Improvement in the Manufacture of Brooms; and I do hereby declare that the following is a full, clear, and exact description thereof, reference being had to the accompanying drawings, making a part of this specification, in which—

Figure 1 is a section through my improved broom, showing the manner of securing the whisps of corn together. Fig. 2 is a detached view of the clasp and transverse bar which are used to confine the whisks of corn in a proper shape.

Similar letters of reference indicate corresponding parts in both figures.

The object of this invention and improvement in brooms is to so construct the parts which contain and confine the whisks of corn in the desired shape that almost any person without tools may take an old and useless broom to pieces and substitute new whisks of broom-corn for the old, and make a strong and substantial broom.

To enable my invention to be fully understood, I will proceed to describe its construction and operation.

In Fig. 1 of the accompanying drawings, A represents the handle of the broom, into one end of which a hole is bored a suitable distance, and into this hole one end of a long rod, B, is introduced and secured to the handle by a pin, $a$, which passes transversely through the handle and through a hole in the rod. Handle A has a metal ferrule, C, on its lower end, through which rod B passes. The rod B is long enough to reach well down into the broom and on the lower end of this rod a male screw-thread is cut.

D is a metal cap, which is flat and flaring, corresponding in shape to the upper end of the broom when the butt-ends of the whisks are drawn together, as shown in Fig. 1. The lower or flaring edge of cap D is curved upward, allowing the ends thereof to project well down over the broom corn, as shown in Fig. 1. The top of this cap D is circular, and it may be slightly larger in diameter than the ferrule on the end of handle A.

E is a narrow strip of strap-iron, which is bent in the oblong shape shown in Fig. 2, forming a clasp, which has several holes made through its ends at suitable distances apart. These ends of strip E are lapped one over the other, as shown in Fig. 2, and secured together by a screw-bolt, $b$, and nut $c$, which passes transversely across the clasp. The nut $c$ is grooved so that two of its edges will project over the edges of the clasp, thus preventing the nut from turning. A screw-bolt, $d$, and nut $e$, similarly constructed to bolt $b$ and nut $c$, are used near the opposite end of the clasp, as shown in Fig. 1.

G is a bar, which is not quite as long as clasp E, and which has a screw-hole, $g$, through it to receive the screw B′ on the end of screw B, as shown in Fig. 1. The bolts $b$ and $d$ pass through holes made through the ends of bar G, and when the broom is finished this bar G is confined in the middle thereof, as shown in Fig. 2, with the whisks covering each side and the ends of this bar. The broom is now formed in the following manner: The whisks of broom-corn are introduced through the clasp E, the bar G, and screws $b$ $d$ being removed, and when the required number of whisks have been thus bunched together the bar G is introduced in the middle of the clasp between the corn, as shown in Fig. 1. The clasp is now drawn tightly around the whisks, and the bolts $b$ $d$ are passed through the clasp and secured by their respective nuts $c$ $e$. Rod B is now passed down through the center of the broom-corn thus confined by the clasp E, and screwed into the hole $g$ through bar G. The butt ends of the whisks are all gathered together and the cap D is pressed down over these ends and properly adjusted. The handle A is now turned so as to force the rod B through bar G, and thus press the cap D down over the butt-ends of the whisks, as shown in Fig. 1. The clasp E can now be further tightened by turning screws $b$ and $d$, and the whisks will all be properly confined in their places. It is now desired, in order to complete the broom, to secure the rod B from turning, in using the broom, the consequence of which would be to loosen the cap D and clasp E, and allow the whisks of corn to escape from the broom.

For securing the handle against turning casually, I form a groove, $h$, in the handle A, which is partly covered by the cylindrical portion of the ferrule, and into this groove a pin or bolt, $k$, is introduced through a hole in the ferrule. A thumb-pin, $i$, is now passed through a slot in the ferrule and screwed into the bolt $k$, as shown in Fig. 1. Now, by means of the thumb-pin $i$—which pin may be made so as to secure the bolt in any desired position—the bolt is moved endwise in its groove $h$, and the end of the bolt is forced into a hole which is made in the top of cap D, when it is desired to prevent the handle A from being turned. The bolt is withdrawn from cap D when it is desired to turn the handle A.

A number of bolt-holes may be made through the end of cap D for receiving the bolt $k$, which will allow the bolt to be forced into the cap at various points.

The clasp or band E may at any time be tightened by withdrawing the bolt $b$ and lapping the ends over farther, then inserting the bolt again and screwing it up tightly.

Having thus described my invention, I claim as new and desire to secure by Letters Patent as an improved article of manufacture—

A broom made with a screw-rod, B, adjustable clasp E, central bar G, bolts $b$, cap D, ferrule $c$, bolt $k$, and handle A, in the manner herein shown and described.

WM. N. BATES.

Witnesses:
D. B. BATES,
MARTIN CLARK.